United States Patent [19]
Raimondi

[11] 3,966,279
[45] June 29, 1976

[54] HIGH-LOAD CAPACITY, NON-TILTING THRUST BEARING

[75] Inventor: Albert A. Raimondi, Monroeville, Pa.

[73] Assignee: Westinghouse Electric Corporation, Pittsburgh, Pa.

[22] Filed: June 6, 1975

[21] Appl. No.: 584,429

[52] U.S. Cl. .............................. 308/160; 308/168
[51] Int. Cl.² ...................................... F16C 17/06
[58] Field of Search ........................... 308/168, 160

[56] References Cited
UNITED STATES PATENTS

| | | | |
|---|---|---|---|
| 1,227,082 | 5/1917 | Seymour, Jr. | 308/168 |
| 1,825,519 | 9/1931 | Gordon | 308/168 |
| 1,967,048 | 7/1934 | Barnard | 308/168 |
| 2,061,966 | 11/1936 | Howarth | 308/168 |
| 2,062,920 | 12/1936 | Mapo et al. | 308/168 |
| 2,406,505 | 8/1946 | Myers | 308/168 |
| 2,719,667 | 10/1955 | Kaczor | 308/168 |
| 2,824,521 | 2/1958 | Birkigt | 308/168 |
| 3,893,737 | 7/1975 | Tyson | 308/168 |

Primary Examiner—M. H. Wood, Jr.
Assistant Examiner—Gene A. Church
Attorney, Agent, or Firm—Dennis T. Griggs

[57] ABSTRACT

A thrust bearing for supporting a rotating shaft. Rotation of the shaft generates a hydrodynamic film of lubricating fluid between a thrust runner mounted on the shaft and a bearing pad disposed within a bearing housing. A restrictor-compensated channel extending through the bearing pad conducts a portion of the pressurized lubricating fluid from the hydrodynamic film into a pocket, or cavity, disposed on that surface of the bearing pad adjacent the bearing housing. Conduction of pressurized lubricating fluid from the hydrodynamic film into the pocket produces a hydrostatic film of lubricating fluid between the bearing pad and the bearing housing to support the bearing pad away from the bearing housing. Further, a step, or notch, is disposed on the surface of the bearing pad adjacent the thrust runner to both increase the load-carrying capacity of the bearing and to obviate the necessity of the bearing pad tilting to generate the hydrodynamic film.

5 Claims, 7 Drawing Figures

FIG. I.

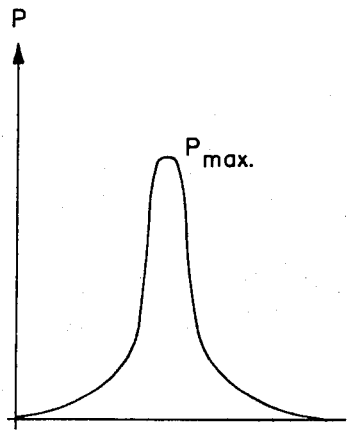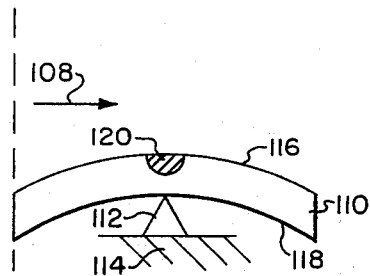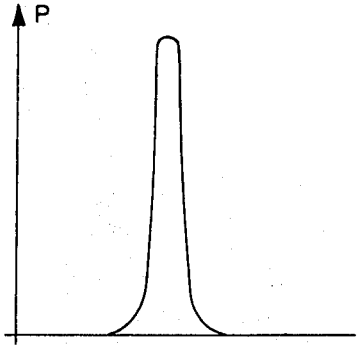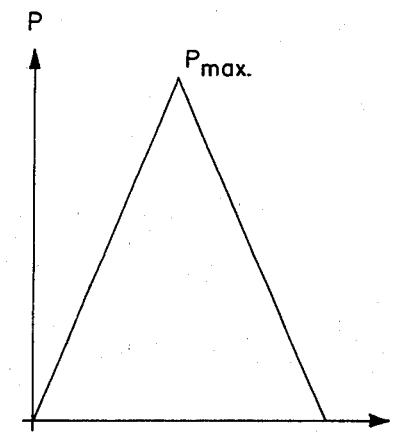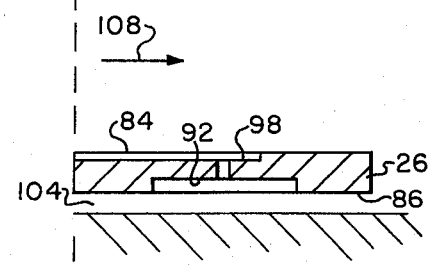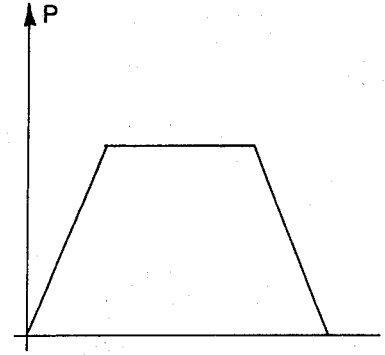
FIG. 5A. PRIOR ART　　　　FIG. 5B.

HIGH-LOAD CAPACITY, NON-TILTING THRUST BEARING

BACKGROUND OF THE INVENTION

1. Field of the Invention

This invention relates to thrust bearings, and in particular, to a non-tilting thrust bearing having a hydrostatic fluid film supporting the bearing pad away from its associated housing.

2. Description of the Prior Art

A thrust bearing is a device adapted to support a rotating shaft and to accommodate a load imposed thereon directed along the axis of the shaft. In general, the thrust bearing device comprises a housing completely surrounding the rotating shaft and supporting therewithin a bearing pad disposed in a bearing relationship with a thrust runner securely affixed to the shaft. A suitable lubricating fluid is provided and a hydrodynamic fluid film is generated between the bearing pad and the thrust runner when the shaft is rotating to provide a bearing surface on which the shaft may freely rotate and to support the shaft away from the bearing pad.

In the prior art, the bearing pad is physically affixed to the associated housing, most commonly by the provision of a pivoting contact about which the bearing pad tilts in order to facilitate generation of the hydrodynamic film. It has been found that the disposition of a high pressure layer of fluid film from the hydrodynamic layer exerts a force on the bearing pad which, when combined with the reactive force imposed upon the bearing from the pivotal contact, leads to a premature failure of the bearing pad.

The typical prior art bearing pads have been shown to deform due to the hydrodynamic oil film pressure acting on the upper surface of the pad between the pad and the thrust runner and also due to the thermal gradient which occurs across the pad thickness. The thermal gradient is produced by the heat generated within the hydrodynamic film which causes the upper surface of the pad to be exposed to a higher temperature than the temperature at the lower surface of the pad.

As a greater axial load is applied to the bearing pad, an increased deformation occurs necessitating an oil film pressure distribution exhibiting a sharp peak located at approximately the center of the pad. Such a pressure distribution increases the pressure force acting on the upper surface of the pad and also increases local heating at the pad center. The combination of the compressive stress due to the higher pressure force within the oil film and the high temperature at the pad surface ultimately causes plastic deformation of the bearing pad, with complete failure the most probable result.

SUMMARY OF THE INVENTION

This invention provides a thrust bearing for supporting a rotating shaft having a thrust runner disposed thereon away from its associated support structure in a manner which completely eliminates the aforementioned problems of the prior art. A bearing pad is disposed within the associated bearing housing, the pad having a pocket formed therein on that surface of the pad adjacent the bearing housing. Suitable conduction means, most commonly a channel extending axially through the pad, conducts high pressure lubricating fluid from the hydrodynamic fluid film into the pocket when the shaft is rotating. The provision of high pressure lubricating fluid in the pocket generates a hydrostatic fluid film which supports the pad away from the bearing housing. The elimination of the physical pivoting contact on the thrust bearing embodying the teachings of this invention avoids generation of reactive forces on the bearing pad, thus significantly lowering the probability of pad failure.

A step, or notch, disposed on the surface of the bearing pad adjacent the thrust runner and enabling the bearing to accommodate an increased load carrying capacity, eliminates the requirement of having the pad tilt to generate the hydrodynamic film.

The channel which conducts the high pressure fluid from the hydrodynamic layer into the pocket on the lower surface of the bearing pad is a substantially axially extending channel having a restrictor orifice therein. The provision of corresponding spherical surfaces on the lower surface of the bearing pad and on the support housing provides a self-aligning feature to a bearing embodying the teachings of this invention.

It is an object of this invention to provide high load capacity thrust bearing utilizing a hydrostatic fluid film layer between the bearing pad and the support housing, the hydrostatic layer being generated by conduction of a portion of the highly pressurized hydrodynamic fluid film into a pocket disposed on the surface of the bearing pad adjacent the support housing.

It is a further object of this invention to eliminate the physical pivoting connection between the bearing pad and the associated support housing that is prevalent in the prior art.

It is a still further object of this invention to eliminate the tilting requirement for thrust bearings and to increase the load carrying capacity of the thrust bearing by providing a step on the surface of the bearing disposed in a thrust supporting relationship with a thrust runner mounted on a rotating shaft.

Other objects of this invention will be made clear in the following detailed description of the preferred embodiments.

BRIEF DESCRIPTION OF THE DRAWINGS

The invention will be more fully understood from the following detailed description of the preferred embodiment taken in connection with the accompanying drawings, in which:

FIGS. 5A and 5B respectively represent a schematic representation of the forces imposed upon a thrust bearing pad of the prior art and on a thrust bearing embodying the teachings of this invention; and, FIG. 6 is a sectional view, similar to FIG. 2 showing an alternative embodiment of this invention.

DESCRIPTION OF THE PREFERRED EMBODIMENT

Figure 1:
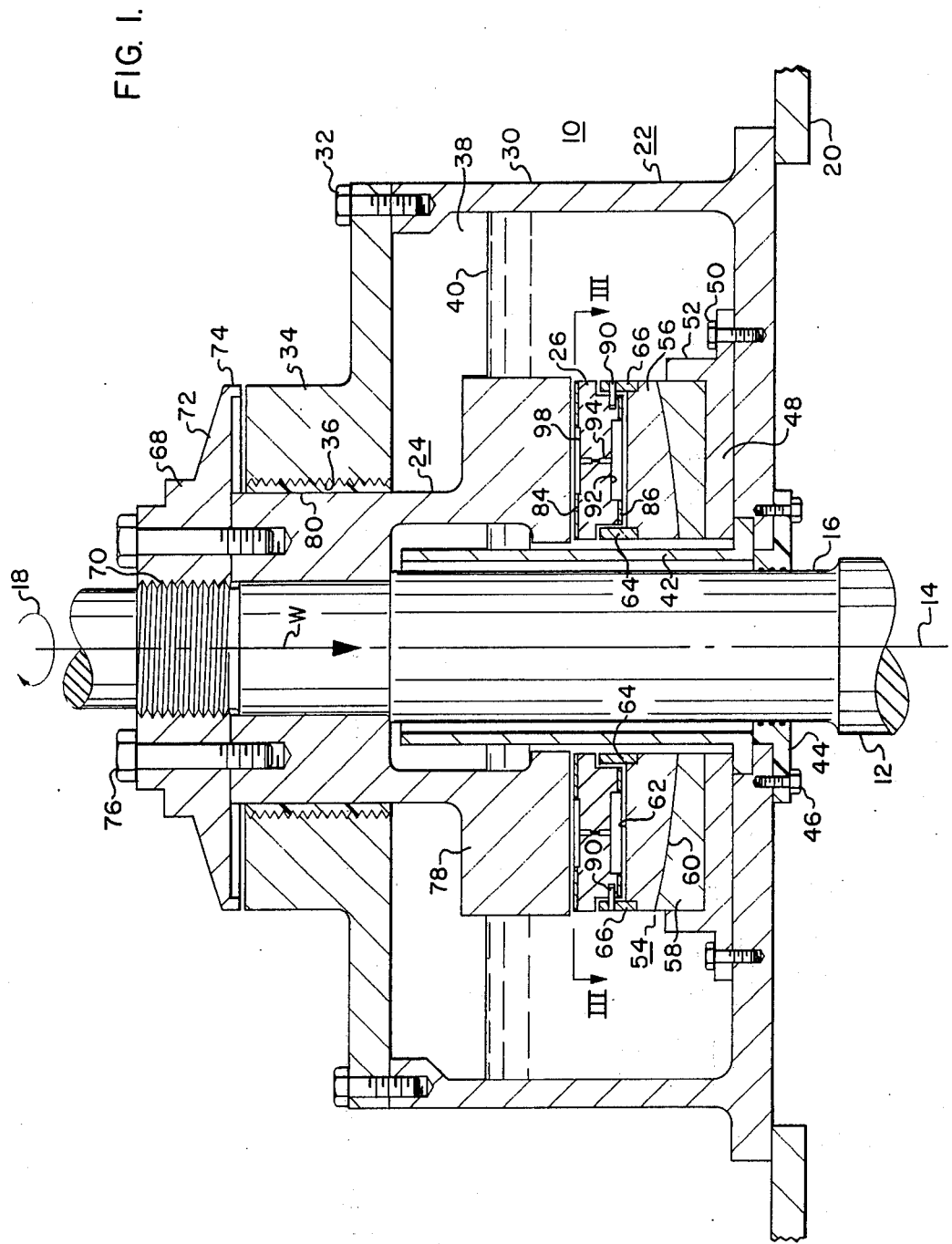
FIG. 1 is a sectional view of a thrust bearing structure embodying the teachings of this invention.

Throughout the following description, similar reference numerals refer to similar elements in all figures of the drawings.

Referring first to FIG. 1, a sectional view of a thrust bearing structure generally indicated by reference numeral 10 embodying the teachings of this invention is shown. The bearing structure 10 rotationally and axially supports a shaft 12 having an axis 14 extending therethrough. The shaft 12 is journaled, as illustrated by reference numeral 16. The bearing structure 10 supports an axial load imposed on the shaft 12, the load being generally illustrated by reference numeral W, and also permits the shaft 12 to rotate freely about the axis 14 in a direction indicated by reference numeral 18.

The bearing structure 10 is usually mounted within the housing of a large rotating machine of which the shaft 12 is a part, such as a turbogenerator, the mounting of the bearing structure 10 being generally indicated at reference numeral 20.

In general, the bearing structure 10 comprises a stationary portion generally indicated by reference numeral 22 which supports the axial load and permits rotational movement of the shaft 12. Attached to the shaft 12 and generally indicated by reference numeral 24 is a rotating structure which cooperates with the stationary portion 22 of the bearing 10. Intermediate between the rotating structure 24 and the stationary structure 22 is a bearing pad, generally indicated by reference numeral 26, which embodies the teachings of this invention. The bearing pad 26 provides the bearing surface on which the shaft 12 and its associated rotating structure 24 is rotatably supported within the stationary structure 22.

The stationary structure 22 comprises a generally cylindrical bearing housing 30 mounted, as shown at reference numeral 20, to the rotating apparatus of which the shaft 12 is a part. The shaft 12 extends completely through the housing 30. Attached to the housing 30, by suitable means such as bolts 32, is an annular cover plate 34. The cover plate 34 has an opening 36 therein which is generally larger in a radial direction, relative to the axis 14, than the shaft 12 passing therethrough. The interior of the housing 30 and the cover 34 define a generally annular internal cavity 38 in which is disposed a lubricating fluid, commonly oil, the level of which within the cavity 38 is indicated by reference numeral 40. As seen in FIG. 1, the bearing pad 26 is completely immersed beneath the oil level 40.

A stand pipe 42 is mounted within the housing 30, the axis of the stand pipe 42 being coincidental with the axis 14 of the shaft 12. A seal generally indicated by reference numeral 44, is securely affixed to the housing 30 by suitable means, such as a bolt 46. The seal 44 is disposed with a predetermined close clearance with the shaft 12 as it passes through the housing 30 and prevents foreign matter from entering into the cavity 38 within the housing.

An annular bracket 48 is mounted on the interior of the housing 30 by suitable means of attachment, such as a bolt 50. The bracket 48 has a ridge 52 thereon sized to receive a generally annular bearing pad seat 54. The pad seat 54 is comprised of an upper portion 56 and a lower portion 58 which mate together along a substantially spherical interface generally indicated by reference numeral 60. As will be explained more fully herein, the spherical interface 60 between the upper pad seat portion 56 and the lower pad seat portion 58 accommodates any initial misalignment between the rotating portion 24 and the stationary portion 22 of the bearing structure 10. A recess 62 is defined by the upper pad seat portion 56 and by a concentric pair of annular end plates 64 and 66 mounted on the upper seat portion 56.

The rotating structure 24 comprises a cap member 68 which is securely affixed to the shaft 12 by suitable means, illustrated in FIG. 1 as the threaded engagement 70. The cap 68 has a radially outward flaring portion 72 thereon which terminates in a substantially axial-extending lip 74. As seen in FIG. 1, the radial dimension of the cap 68 taken across the lip 74 is coextensive with the radial dimension of the cover plate 34; however, it is to be understood that the cap 68 may extend radially so as to permit the lip 74 to overlap a portion of the cap 34.

The cap 68 is suitably attached, by clamps 76 or other suitable means, to a thrust runner 78. The runner 78 axially surrounds the shaft 12 and extends a predetermined axial distance relative thereto through the opening 36 formed in the cover plate 34 and extends into the cavity 38 within the housing 30. A seal, generally indicated by reference numeral 80, is provided between the radially outer surface of the runner 78 and the inner surface of the cover plate 34 which defines the opening 36. The seal 80 is provided to prevent the introduction of foreign matter into the cavity 38, a function similar to that ascribed to the seal 44.

Figure 2:
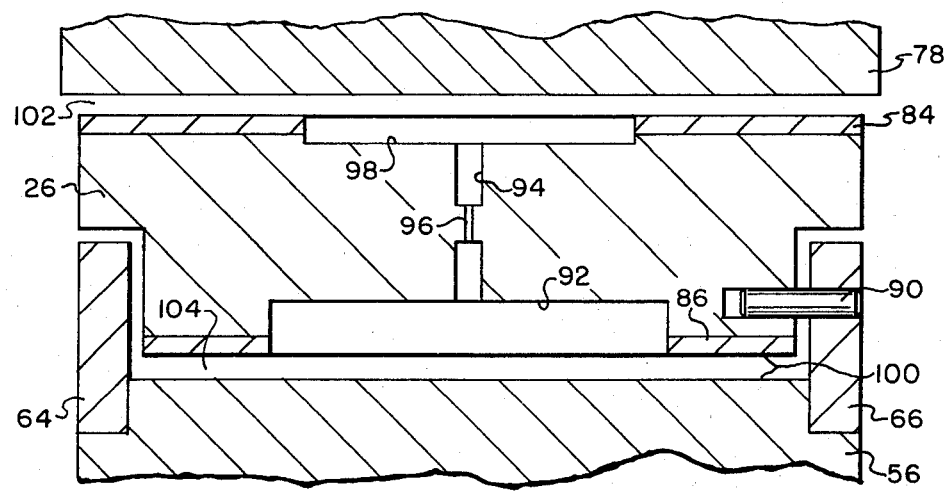
FIG. 2 is an expanded section view of a portion of the bearing member embodying the teachings of this invention shown in FIG. 1.
Figure 3:
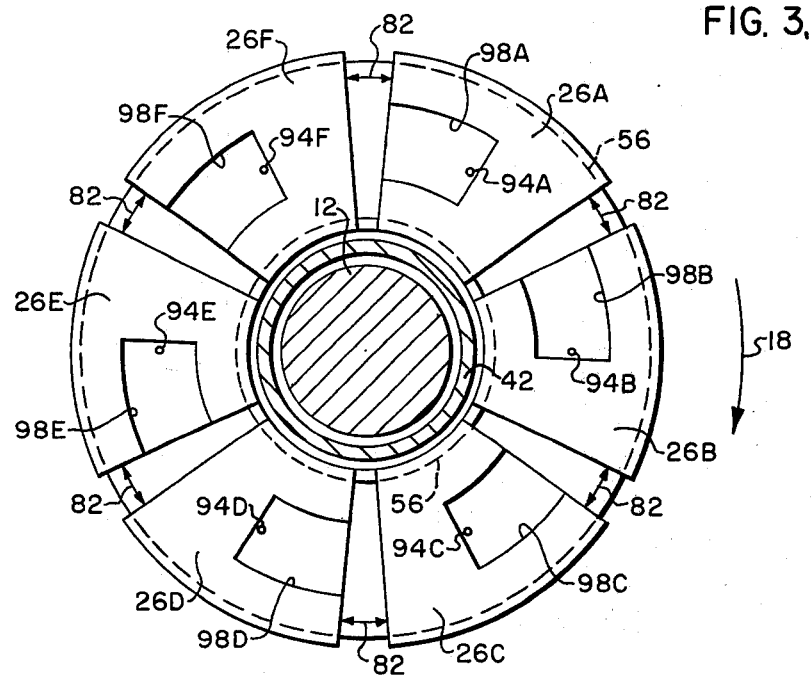
FIG. 3 is a sectional view taken along section lines III—III of FIG. 1.

Referring now to FIGS. 1 and 2, the bearing pad 26 which defines the bearing surface to rotatably support the shaft 12 and to absorb the axial load W imposed thereon is shown. The pad 26 itself is a substantially annular member fabricated of copper or some similar material having a high thermal conductivity. For ease of manufacture and fabrication, the pad 26 may be comprised of a plurality of segments, as indicated in FIG. 3, by reference numerals 26A through 26F, it being understood that any predetermined number of segments may be used to fabricate the annular pad 26. As seen in FIG. 3, each of the circumferentially adjacent segments 26A-F is spaced a predetermined circumferential distance 82 apart.

Referring to FIGS. 1 and 2, it being understood that although FIG. 2 shows only a portion of the bearing pad 26 the principles of operation explained in connection therewith are applicable to the entire pad 26, the axially upper and lower surface of each pad 26 is provided with a babbitted layer indicated by reference numerals 84 and 86, respectively. As appreciated by those skilled in the art, the babbitt layers 84 and 86 are provided to prevent excessive wear to the copper or other material used to fabricate the pad 26. As shown in the figures, the pad 26 is received by and disposed within the recess 62 provided within the upper pad seat 56. A stop 90 extends radially between the outer end plate 66 and the bearing pad 26 to prevent rotation between the pad 26 and the stationary bearing structure 22.

As best seen in FIG. 2, a cavity or pocket 92 is provided in the axially lower surface 86 of the bearing pad 26. Extending completely through the pad 26 in an axial direction is a channel 94 having disposed therein a restrictor compensated orifice 96. Disposed into the upper axial surface 84 of the pad 26 is a step or notch 98, the axial dimension thereof being substantially less than the axial dimension of the pocket 92 disposed on the axial lower surface of the pad 26. As will be explained more fully herein, the step 98 is provided so as to substantially increase the load carrying capacity of the bearing 10 and to eliminate the necessity of the pad 26 tilting in order to generate a lubricating film surface needed to support the runner 78. The pocket 92 communicates with the step 98 through the channel 94 having the restrictor compensated orifice 96 therein, as viewed in FIG. 2. The lower axial surface 86 of the pad 26 and the upper pad seat 56 define a rectangular interface 100 therebetween.

In operation, rotation of the shaft 12 in the direction 18 will, as a natural consequence of such rotation and as a consequence of a shearing force generated thereby, produce a hydrodynamic layer of lubricating fluid illustrated in FIG. 2 by reference numeral 102 between the upper surface 84 of the bearing pad 26 and the thrust runner 78. The hydrodynamic oil film 102 developed between the bearing pad 26 and the runner 78 provides the film surface which permits rotation of the shaft 12 relative to the bearing pad 26. As will be more fully described in connection with FIG. 5, the pressure distribution within the hydrodynamic film layer 102 is well known, and, according to the teachings of this invention, the channel 94 is disposed within the pad 26 at the point thereon at which the highest pressure force occurs within the hydrodynamic film 102. Thus, highly pressurized fluid is bled from the hydrodynamic film 102 and passes through the channel 94 having the restrictor 96 therein and to fill the pocket 92 and form a hydrostatic oil film 104 between the lower surface 86 of the pad 26 and the upper pad seat 56. It is to be understood any disposition of the channel 94 such as to bleed lubricating fluid from the high pressure hydrodynamic layer 102 and conduct that fluid into the pocket 92 to form the hydrostatic film 104 is within the contemplation of this invention, it also being understood that the most expeditious and advantageous disposition of the channel 96 is that disposition which occurs adjacent the highest pressure concentration within the hydrodynamic film 102.

It may be readily appreciated that the pressure within the hydrostatic film 104 bled from the hydrodynamic film 102 is sufficient to support the bearing pad 26 away from the upper pad seat 56. In the prior art, it is the practice for the bearing pad to be physically in contact with and supported by some portion of the stationary bearing structure. However, as will be more analytically described in connection with FIG. 5, such a physical contact, (usually a pivot contact between the pad and the stationary structure) engenders a high failure probability and for this reason, renders the prior art thrust bearing defective. However, a thrust bearing structure 10 embodying the teachings of this invention disposes the bearing pad 26 on a high pressure hydrostatic layer 104 of lubricating fluid. The highly pressurized hydrostatic layer 104 is bled from the hydrodynamic layer 102 through the restrictor compensated channel 94. By eliminating the pivoting physical contact between the pad and the stationary structure as exemplified by the prior art and by providing a hydrostatic oil film 102 on which the pad 26 is supported away from the upper pad seat 56, th disadvantages attendent with the prior art configuration are substantially eliminated. Although there are examples of prior art journal bearings which utilize a hydrostatic layer of fluid to support the journal bearing structure, such as the applicant's copending application Ser. No. 374,179, filed June 27, 1973 and assigned to the assignee of this invention, and U.S. Pat. No. 3,549,215, there has never been applied to the totally non-analogous thrust bearing art any device characterized by the teachings of this invention.

As mentioned earlier, step 98 is provided within the upper axial surface 84 in order to increase the load carrying capacity of the bearing 10, as will be explained more fully in connection with FIG. 5. Further, the step 98 facilitates the generation of the hydrodynamic oil film 102 upon the startup of the rotation of the shaft 12. In the prior art, upon startup of shaft rotation, the bearing pad is required to tilt, relative to the axis of the shaft, in order to begin the generation of the hydrodynamic film. However, with the provision of the step 98 as shown in FIG. 2, such tilting at startup in order to assist the generation of the hydrodynamic film 102 is not required. According to the teachings of this invention, the tilt is completely eliminated by the provision of the step 98. Also, as explained more fully in connection with FIG. 5, the provision of the step 98 in the upper surface of bearing pad 26 provides a more desirable pressure distribution within the hydrodynamic film 102.

Figure 4:
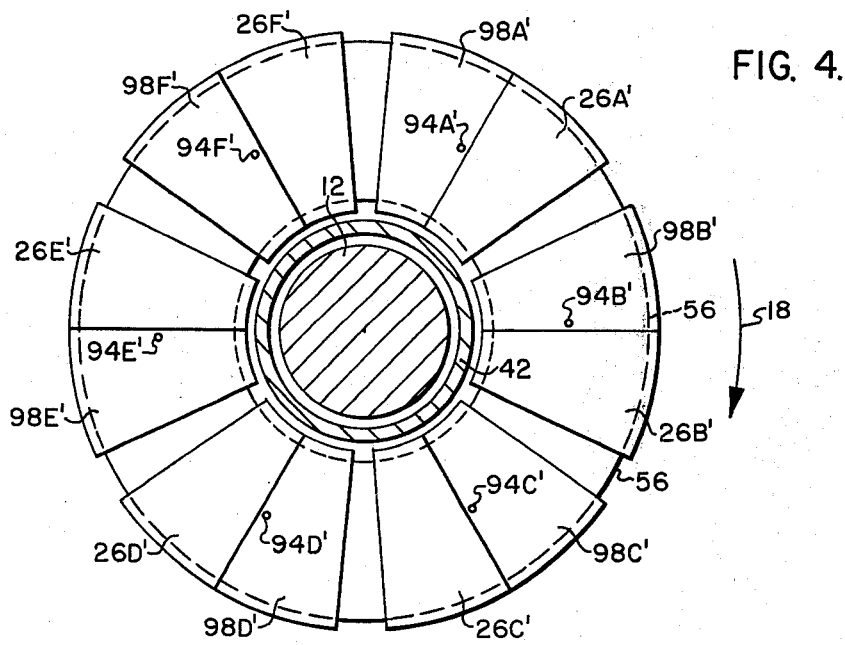
FIG. 4 is a view, similar to FIG. 3, showing an alternate embodiment of the invention.

The step 98, as mentioned several times previously hereto, enhances the load carrying capacity of a thrust bearing embodying the teachings of this invention. The step 98 may be completely enclosed, as shown in FIGS. 1 through 3, that is, completely surrounded by the babbitted surface 84 disposed on the pad 26. However, as seen by reference to FIG. 4, the step 98' may be "open," that is, the step 98' may be provided so as to communicate directly with the cavity 38 having the lubricating fluid therein.

Referring now to FIG. 5, a schematic representation of a prior art bearing pad and a bearing pad embodying the teachings of this invention is shown and the force distributions acting across the upper and lower surfaces of each bearing pad is depicted.

Referring to FIG. 5A, with rotation direction being indicated by arrows 108, a prior art bearing pad 110 is shown as being physically connected through a pivot 112 with a stationary support 114. A graphical representation of the pressure distribution across the upper surface 116 of the pad 110 is given, with the ordinate of the graphical depiction indicating the magnitude of the pressure existing within the hydrodynamic layer while the abscissa thereof indicates location on the upper surface 116 of the pad 110 proceeding from the left to the right in FIG. 5A. Similarly, the force imposed upon the lower surface 118 of the pad 110 used in prior art bearings is indicated on the ordinate of the lower graphical depiction, while the abscissa thereof similarly illustrates the pad surface proceeding from left to right. It is seen that in operation, a pad 110 pivotally supported by pivot 112 is exposed to an extremely high reactive force imposed by the pivot point 112 upon the lower surface 118 of the pad 110. The magnitude of the reactive force is graphically illustrated in the lower depiction. At the same time, the upper surface 116 of the pad 110 is subjected to a peak pressure $P_{MAX}$ at a point thereon axially oppostie the point at which the reactive force is concentrated. In addition, heat developed within the pad 110, combined with the comprehensive stress of the oil film and the reactive force of the pivot attached led to the development of an incipient failure area generally indicated by reference numeral 120 quickly developed within prior art bearing pads.

Referring to FIG. 5B, it may be seen that a pad 26 embodying the teachings of this invention and disposing a hydrostatic film 104 between the lower axial surface 78 of the pad 26 and the support structure provides a more evenly distributed reactive force upon the lower axial surface 84 of the pad 26. Since the physical attachment which existed in the prior art is eliminated in a pad embodying the teachings of this invention, there occurs no high reactive force of attachment imposed upon the lower axial surface 84 of the pad 26. Further, the disposition of a closed step 98 in the upper axial surface 84 of the pad 26 has been shown to generate a maximum pressure force $P_{MAX}$ which is greater than the corresponding pressure force developed with a flat upper surface. This larger hydrodynamic pressure force may thus support an increased load W (FIG. 1) and thus improve the load carrying capacity of a pad 26 embodying the teachings of this invention. Yet in addition to these advantages, there is no incipient fracture area occurring within the pad 26, since the high reactive force attendant upon the physical pivoting, as in prior art bearing pads, is eliminated. It is thus seen that a pad embodying the teachings of this invention has an improved load carrying capacity due to the provision of the step 98 and the generation of high maximum pressures within the hydrodynamic layer 104, yet at the same time, provides a longer life for the bearing pad 26 due to the elimination of the physical pivot of the prior art and the substitution therefore of the hydrostatic layer 104 between the bearing pad 26 and the support structure. As a further advantage, heat generated within the hydrodynamic layer 102 is effectively conducted from the hydrodynamic layer 102 due to the high heat conduction characteristic of the pad 26, thus inhibiting the incipient failure area.

Still further, the provision of the step 98 on the pad 26 eliminates the need for tilting of the pad 26 to generate the hydrodynamic layer. Thus, during start-up, the rubbing surfaces are in contact for a shorter period of time resulting in less friction and wear.

Figure 6:
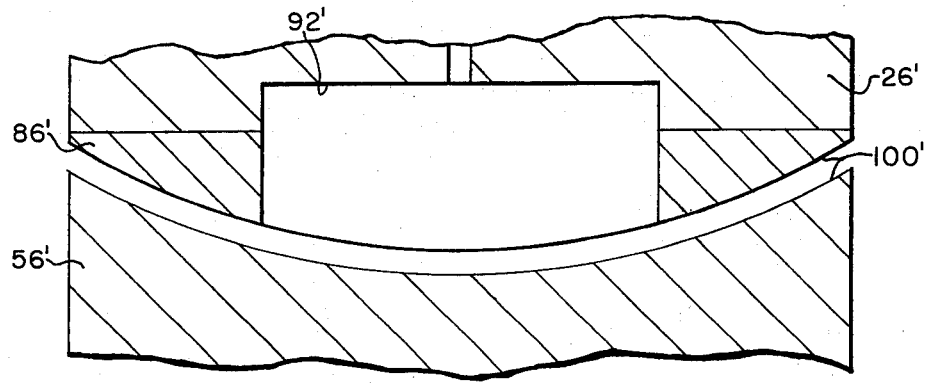

Referring now to FIG. 6, an alternative embodiment of the invention is shown. In FIG. 6, the lower surface 86' of the pad 26 defines a spherical interface 100' with a correspondingly curved upper pad seat 56'. The provision of the spherical interface 100' between the surface 86' and the upper pad seat 56' does not alter the generation and effect of the hydrostatic layer 104 described in connection with the other figures. However, provision of this spherical interface 100' provides a further improvement over the prior art. In the prior art, which required physical contact between the bearing pad and its support structure, the only surface available for axial alignment of the bearing to accommodate shifting of the shaft is provided in the interface 60 between the mated upper and lower pad seats 56 and 58, respectively. However, it will be observed that the spherical interface 60 is a rubbing interface and, as such, high coefficients of friction are present which inhibit the bearing from aligning with deflections of the shaft 12. Conversely however, between the spherical interface 100' of the bearing pad 26 embodying the teachings of this invention, there is disposed a hydrostatic oil film 104. It is readily appreciated that the coefficient of friction along the spherical interface 100' in order of magnitudes lower than the coefficient along the spherical interface. It may thus be appreciated that a bearing structure embodying the teachings of this invention will readily accommodate deflections of the shaft and permit axial alignment therof.

I claim as my invention:

1. A thrust bearing for supporting a rotating shaft, a portion of said shaft having a thrust runner mounted securely thereon, said bearing comprising:

a bearing housing having a fluid cavity therein, said shaft extending through said housing so that said thrust runner is disposed within said fluid cavity;

a bearing pad having an upper and a lower axial surface thereon disposed within said housing so that said upper surface is adjacent to said thrust runner in a shaft supporting position, said pad having a pocket disposed on said lower surface thereof and a step disposed on said upper surface thereof;

a lubricating fluid disposed within said cavity, said lubricating fluid forming a hydrodynamic film between said upper surface of said pad and said thrust runner when said shaft is rotating, said hydrodynamic film being disposed within said step provided on said upper surface and having a predetermined pressure existing therein when said shaft is rotating; and means for conducting a portion of said pressurized hydrodynamic film into said pocket to form a hydrostatic film of fluid between said lower surface of said pad and said housing to support said pad away from said housing.

2. The device of claim 1 wherein:

said means comprise a channel extending axially through said pad, said channel communicating with said hydrodynamic layer disposed within said step and with said pocket, said channel having a restrictor orifice therein.

3. The device of claim 2, wherein said pocket on said upper surface of said bearing pad is completely surrounded by said bearing pad on at least three sides.

4. The device of claim 2, wherein said pocket disposed on said upper surface of said bearing pad communicates with said fluid cavity disposed within said bearing housing.

5. The device of claim 2 wherein said lower surface of said bearing pad has a substantially spherical contour thereon and, wherein said housing has a correspondingly spherical surface disposed therein adjacent said spherical contour disposed on said lower surface of said bearing pad.

* * * * *